April 16, 1929.　　D'ORSAY McC. WHITE　　1,709,163
METHOD OF MAKING WHEEL PARTS
Filed Oct. 1, 1925
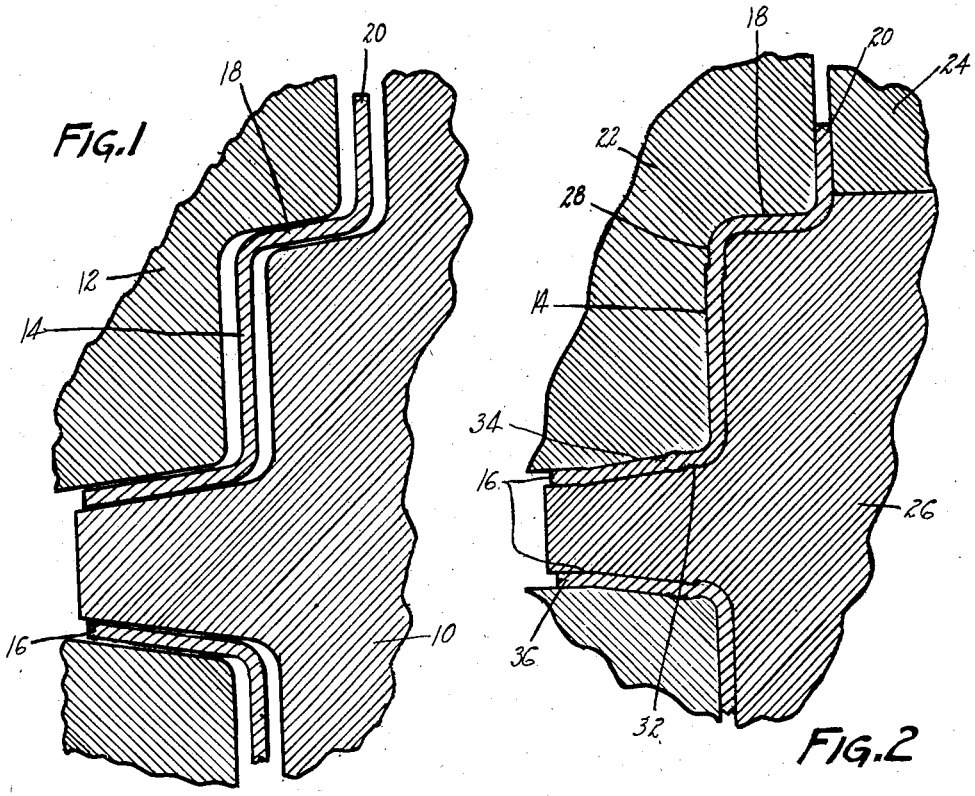
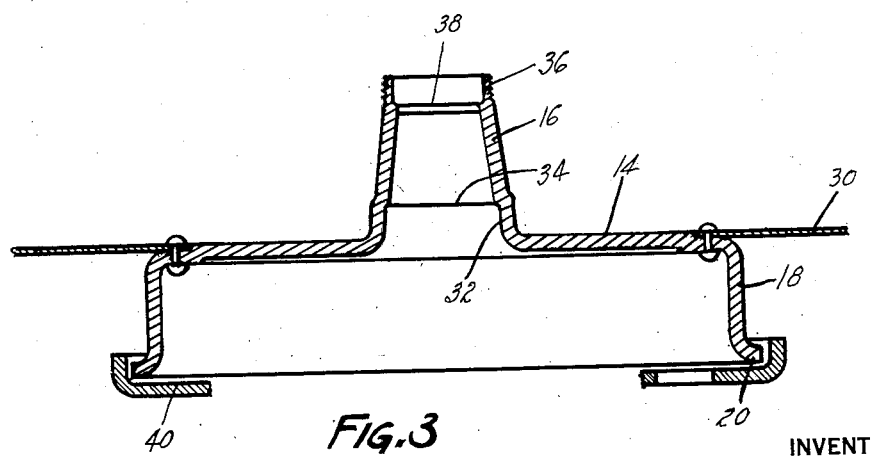
INVENTOR
D'ORSAY McCALL WHITE
BY
M.W. McConkey
ATTORNEY Patented Apr. 16, 1929.

1,709,163

UNITED STATES PATENT OFFICE.

D'ORSAY McCALL WHITE, OF CHICAGO, ILLINOIS, ASSIGNOR TO MOTOR INDUSTRIES, INC., OF CHICAGO, ILLINOIS, A CORPORATION OF ILLINOIS.

METHOD OF MAKING WHEEL PARTS.

Application filed October 1, 1925. Serial No. 59,805.

This invention relates to the manufacture of wheels, and will be described as carried out in making a one-piece combination hub and brake drum arranged to carry an outer annular rim-carrying wheel disk.

It is highly desirable to make the parts of disk wheels of alloy steels, and more especially it is desirable to make the brake drums of high carbon steel, preferably containing upwards of .40% of carbon. By the present methods of manufacture, however, the working of such materials is extremely difficult, resulting in many rejections and requiring a great deal of extra machining and other finishing, and the cost is therefore prohibitive except in very expensive cars.

By my novel method, the blanks, as for example disks of .40% carbon steel, are first pressed, preferably hot, to form the necessary flanges slightly under-size, and the flanges are then stretched, preferably cold, in one or more operations to their final diameters and shapes. This permits the performance of most of the drawing on a heated blank, whereas the inevitable distortion of the blank in cooling is taken care of by the final shaping operation on the cold blank.

In the particular method hereafter described, and which may be varied within the terms of the claims, the hub flange and the brake drum flange are conical, as drawn from the hot blank, and project from the blank in opposite directions, although the taper of the two flanges is in the same direction. In the second pressing operation, the brake drum flange is stretched to cylindrical form, and the blank is preferably offset to receive the edge of the wheel disk. When the blank is intended for a front wheel, the hub flange is in this step stretched to form at its base and at its free edge cylindrical parts to receive the usual anti-friction bearings.

The details and advantages of the invention will be apparent from the following description of one modification of the method, as illustrated by the accompanying drawings, in which:

Figure 1 is a section diametrically through part of the first dies, as they are opening after the first pressing;

Figure 2 is a similar section through part of the second dies, closed on the blank in the second pressing; and Figure 3 is a section diametrically through part of the finished wheel.

In the first step, a disk or blank, preferably of .40% carbon steel, is highly heated, and is then drawn or forged by pressing it between an inner die 10 and an outer die 12. The resulting partly-finished blank 14 has at its center a conical tubular hub flange 16, and at its outer edge a conical brake drum flange 18 terminating in a radial flange 20.

In the second step, which may in practice be carried out in a plurality of operations, after the blank has cooled, flange 20 is gripped between an outer die 22 and an annular die or clamp 24, and while it is so held, an inner die 26 is forced into it, stretching flange 18 into cylindrical form, offsetting the blank at 28 to receive the wheel disk 30 (Fig. 3), and stretching the hub flange 16 to its final shape.

The particular wheel shown is intended for a front automobile wheel, and the hub is stretched to form an inner cylindrical seat 32 for an anti-friction bearing (not shown), with an adjacent bearing-positioning shoulder 34, while the outer end is stretched at 36 to make it cylindrical, and is afterwards threaded to receive a hub cap, and bored out to form a seat for the outer anti-friction bearing and an adjacent bearing-positioning shoulder 38.

Finally flange 20 is machined or trimmed to a true circle with its center in the axis of flange 18, to be encircled by the edge flange of a brake backing plate 40.

It is not my intention to limit the scope of the invention to the exact sequence of steps described, or otherwise than by the terms of the appended claims.

I claim:

1. That method of forming a combination hub and brake drum which comprises drawing a blank while hot to form a conical tubular central hub flange and a conical outer brake drum flange, and afterwards pressing the blank while cold to form cylindrical bearing seats in the hub flange and to make the brake drum flange cylindrical.

2. That method of forming a combination hub and brake drum which comprises drawing a blank while hot to form a conical tubular central hub flange projecting in one direction and a conical outer brake drum flange projecting in the opposite direction, the taper of the two flanges being in the same direction, and afterwards pressing the blank while cold to form cylindrical bearing seats in the hub flange and to make the brake drum flange cylindrical.

3. That method of forming a combination hub and brake drum which comprises drawing a blank while hot to form a conical central hub flange and a conical outer brake drum flange, and afterwards pressing the blank while cold to force the brake drum flange into cylindrical form.

4. That method of forming a combination hub and brake drum which comprises drawing a blank while hot to form a conical central hub flange and a conical outer brake drum flange, the flanges projecting from the blank in opposite directions, but tapering in the same direction, and afterwards pressing the blank while cold to force the brake drum flange into cylindrical form.

5. That method of forming wheel parts which comprises the steps of pressing a blank while hot to form a conical brake drum flange flaring away from the blank, and then pressing the blank while cold to make the brake drum flange cylindrical.

6. That method of forming wheel parts which comprises the steps of pressing a blank while hot to form a conical brake drum flange with a radial flange at its edge and flaring away from the blank, then pressing the blank while cold to make the brake drum flange cylindrical, and finally trimming the radial flange to a true circle having its center in the axis of the brake drum flange.

7. That method of forming wheel parts which comprises the steps of pressing a blank while hot to form a conical brake drum flange with a radial flange at its edge and flaring away from the blank, then gripping the radial flange, and pressing the blank while cold, and with the radial flange held, to make the brake drum flange cylindrical.

8. That method of forming wheel parts which comprises the steps of pressing a blank while hot to form a conical brake drum flange with a radial flange at its edge and flaring away from the blank, then gripping the radial flange, pressing the blank while cold, and with the radial flange held, to make the brake drum flange cylindrical, and finally trimming the radial flange to a circle having its center in the axis of the brake drum flange.

9. That method of forming wheel parts which comprises pressing a blank while hot to form a brake drum flange slightly under-size in diameter, and then pressing the blank while cold to stretch said flange to its final diameter.

10. That method of forming wheel parts which comprises pressing a blank while hot to form a brake drum flange slightly under-size in diameter, and then pressing the blank while cold to stretch said flange to its final diameter, and at the same time pressing into the blank a shoulder just inside the flange to form a rabbet to receive the inner edge of an annular wheel disk.

11. That method of forming wheel parts which comprises the steps of pressing a blank while hot to draw at its center a conical tubular hub flange, and then pressing the blank while cold to stretch said flange into cylindrical form at its base and at its free end, leaving an intermediate conical portion.

12. That method of forming wheel parts which comprises the steps of pressing a blank while hot to draw at its center a conical tubular hub flange, and then pressing the blank while cold to stretch said flange into cylindrical form at its base and at its free end, leaving an intermediate conical portion, and at the same time to form a shoulder at the outer edge of the cylindrical part at the base of the flange.

13. That method of forming wheel parts which comprises the steps of pressing a blank while hot to draw at its center a conical tubular hub flange, and then pressing the blank while cold to stretch said flange into cylindrical form at its base and at its free end, leaving an intermediate conical portion, and finally boring out the cylindrical part at the free edge of the flange to form a shoulder at the inner edge of said part.

14. That method of forming wheel parts which comprises the steps of first pressing a blank while hot to draw a tubular hub flange slightly under-size in diameter at its center and an outer brake drum flange slightly under-size in diameter, and then pressing the blank while cold to stretch both flanges to their final dimensions.

15. That method of forming wheel parts which comprises the steps of first pressing a blank to draw a tubular hub flange slightly under-size in diameter at its center and an outer brake drum flange slightly under-size in diameter, and then pressing the blank to stretch both flanges to their final dimensions.

16. That method of forming wheel parts which comprises the steps of first pressing a blank to draw at its center a conical tubular hub flange, and then pressing the blank to stretch said flange into cylindrical form at its base and at its free end, leaving an intermediate conical portion.

17. That method of forming wheel parts which comprises first pressing a blank to form a brake drum flange slightly under-size in diameter, and thereafter stretching said flange to its final diameter.

18. That method of forming wheel parts which comprises first pressing a blank to form an outer flange slightly under-size in diameter, and thereafter stretching said flange to its final diameter.

19. That method of forming a combination hub and wheel part which comprises drawing a blank while hot to form a conical tubular central hub flange and a conical outer edge flange, and afterwards pressing the blank while cold to form cylindrical bearing seats in the hub flange and to make the edge flange cylindrical.

20. That method of forming wheel parts which comprises the steps of pressing a blank while hot to form a conical edge flange flaring away from the blank, and then pressing the blank while cold to make the edge flange cylindrical.

21. That method of forming wheel parts which comprises the steps of first pressing a blank to draw a tubular hub flange slightly under-size in diameter at its center and an outer edge flange slightly under-size in diameter, and then pressing the blank to stretch both flanges to their final dimensions.

In testimony whereof, I have hereunto signed my name.

D'ORSAY McCALL WHITE.